United States Patent
Burdeniuc et al.

(12)

(10) Patent No.: US 6,395,188 B1
(45) Date of Patent: May 28, 2002

(54) TREATMENT OF WATER CONTAINING ORGANIC WASTES WITH AMMONIUM NITRATE

(75) Inventors: Juan Jesus Burdeniuc, Macungie; John Edward Sawicki, Breinigsville; Thomas Albert Johnson, Orefield, all of PA (US); Malee Leeaphon, Cape Elizabeth, ME (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/659,055

(22) Filed: Sep. 11, 2000

Related U.S. Application Data

(63) Continuation-in-part of application No. 09/613,206, filed on Jul. 10, 2000.

(51) Int. Cl.[7] .................................................. C02F 1/72
(52) U.S. Cl. ........................ 210/758; 210/761; 210/906; 210/908; 210/909
(58) Field of Search ................................ 210/758, 761, 210/906, 908, 909

(56) References Cited

U.S. PATENT DOCUMENTS

| | | | |
|---|---|---|---|
| 4,070,281 A | * | 1/1978 | Tagashira et al. |
| 4,654,149 A | | 3/1987 | Harada |
| 5,118,447 A | | 6/1992 | Cox et al. |
| 5,221,486 A | | 6/1993 | Fassbender |
| 5,641,413 A | | 6/1997 | Momont |

FOREIGN PATENT DOCUMENTS

| | | |
|---|---|---|
| GB | 1375259 | 11/1974 |
| JP | 6098297 | 5/1985 |
| JP | 61257292 | 5/1985 |
| JP | 61257291 | 11/1986 |

OTHER PUBLICATIONS

Proesmans, Petra, Luan, Li, and Steven J. Buelow, "Hydrothermal Oxidation of Organic Wastes Using Ammonium Nitrate", Los Alamos National Laboratory (Ind. Eng. Chem Res. 1997, 36 1559–1566.

Leavitt, David D.; Horbath, Joe S.; and Abraham, Martin A. "Homogeneously Catalyzed Oxidation for the Destruction of Aqueous Organic Wastes" Environmental Progress 9 (4), 222–228 (1990).

Leavitt, David D. and Abraham, Martin A., "Acid–Catalyzed Oxidation of a 2,4–Dichlorophenoxyacetic Acid by Ammonium Nitrate in Aqueous Solution", Environ. Sci. Technol. vol. 24, No. 4, 1990. 566–571.

\* cited by examiner

*Primary Examiner*—Betsey Morrison Hoey
(74) *Attorney, Agent, or Firm*—Russell L. Brewer; Mary E. Bongiorno

(57) ABSTRACT

A single step wet oxidation process for treating wastewaters containing organic species, with or without heteroatoms, and anions of strong acids, e.g. sulfate or phosphate ion, or cations of strong bases, e.g., sodium, potassium or calcium ions, and which may contain ammonium ion and/or nitrate ion in addition to added ammonium ion and/or nitrate ion was developed which on thermal treatment near the critical temperature of water removes substantially all the COD and nitrogen through conversion to water, carbon dioxide or carbonate species, nitrogen gas and small amounts of nitrous oxide. Key to the success of the process is the balancing of all reducing species with an equivalent amount of oxidizing species and the balancing of all strong acid anions with strong base cations and including at least 0.06 acetate ion for moles of nitrate in the wet oxidation process.

7 Claims, No Drawings

TREATMENT OF WATER CONTAINING ORGANIC WASTES WITH AMMONIUM NITRATE

CROSS REFERENCE TO RELATED APPLICATIONS

This invention is a continuation-in-part of U.S. Ser. No. 09/613,206 having a filing date of Jul. 10, 2000, entitled "Treatment Of Water Containing Organic Wastes With Ammonium Nitrate" and is incorporated by reference.

BACKGROUND OF THE INVENTION

Wet air oxidation is a well-known treatment process for the removal of COD and BOD from industrial and municipal wastewater streams. The processes involve contacting a wastewater with an oxidizing source, such as oxygen, ammonium nitrate and nitric acid at elevated temperatures and pressures to oxidize pollutants. Most carbonaceous material is converted to carbon dioxide. The nitrogen present either from organo-nitrogen compounds or other sources are converted to nitrogen.

The following references illustrate wet oxidation processes:

Proesmans, Luan and Buelow of Los Alamos National Laboratory (Ind. Eng. Chem. Res. 1997, 36 1559–1566) report on a high temperature and pressure (500° C./345 bar) hydrothermal oxidation process to remove organic compounds from a waste stream using ammonium nitrate as the oxidizing agent. In the oxidation of methanol and phenol, the authors report that unless an excess of oxidizable carbon is present, NOx in the effluent may become a problem. To avoid NOx production and reduce carbon components to carbon dioxide, a polishing step using hydrogen peroxide is suggested.

GB 1,375,259 discloses the wet oxidation of carbon and nitrogen containing materials to gaseous reaction products using HNO3 and/or a nitrate as oxidizing agent, at temperatures of between 150° C. and the critical temperature of water. The preferred oxidizing agent is $NH_4NO_3$, which disappears completely from the reaction medium. Example VII shows the treating of a waste stream of caprolactam, the sodium salt of aminocaproic acid and sodium sulfate with nitric acid at a temperature of 300° C. at 15 bars. The patentees report that slow heating of the reaction mixture resulted in reduced corrosiveness of the reactant mixture.

U.S. Pat. No. 4,654,149 discloses the use of a noble metal catalyst supported on a titania carrier in a wet oxidation process to decompose ammonium nitrate at 250° C. for 60 minutes. Approximately from 50–99% decomposition of both ammonium nitrate and nitrite is achieved without air present. Further examples show wet oxidation of phenol with 0.2 times the required amount of oxygen.

JP 60-98297, JP 61 257,292 and JP 61 257,291, discloses the catalytic wet oxidation of ammonium nitrate wastewaters with 1.0 to 1.5 times the stoichiometric oxygen required for ammonia decomposition, at a pH of 3–11.5 at a temperature from 100 to 370° C. with a supported noble metal catalyst.

U.S. Pat. No. 5,118,447 discloses a process for the thermochemical nitrate destruction where an aqueous solution of nitrate or nitrite is contacted with a stoichiometric amount of formic acid or formate salt, depending upon the pH. Wet oxidation is effected by heating to 200 to 600° C. in the liquid phase to form elemental nitrogen and carbon dioxide. The reaction may be carried out over a pH range of 0–14.

U.S. Pat. No. 5,221,486 discloses a denitrification process where the types of nitrogen compounds present in a waste stream are identified and quantified. The oxidized and reduced forms of nitrogen are balanced and, then, an appropriate nitrogen containing reactant, such as ammonia or a nitrite or nitrate compound, is added and the mixture is heated to 300 to 600° C. under pressure to effect denitrification.

U.S. Pat. No. 5,641,413 discloses the two stage wet oxidation of wastewater containing a carbonaceous and nitrogen species. In the first stage the COD is removed by wet oxidation at a temperature of less than 373° C. and a pressure sufficient to maintain a liquid water phase. The remaining nitrogen compounds are converted to nitrogen in the second stage by adding sufficient inorganic nitrogen-containing compound to the oxidized wastewater to produce essentially equal concentrations of ammonia-nitrogen, nitrite-nitrogen plus nitrate-nitrogen and a waste stream of reduced COD. Mineral acid is added to the oxidized wastewater to produce a pH between 4 and 7. Optionally, a transition metal salt is added, to catalyze a thermal denitrification step. The last step is conducted at 100° to 300° C. to decompose the nitrogen compounds.

D. Leavitt et al in Environmental Progress 9 (4), 222–228 (1990) and in Environ. Sci. Technol. 24 (4), 566–571 (1990) reported that 2,4-dichlorophenoxyacetic acid, atrazine and biphenyl were converted to $CO_2$ and other non-harmful gases ($N_2$ and $N_2O$) trough the homogeneous liquid phase oxidation with ammonium nitrate. These reactions were carried out by dissolving the substrates in polyphosphoric acid, adding ammonium nitrate and then heating to about 260° C. for some period of time. Although this clearly shows that ammonium nitrate is a good oxidizing agent, it is not a process lending itself to treating aqueous waste streams containing only 1,000 to 10,000 ppm TOC.

SUMMARY OF THE INVENTION

This invention relates to an improvement in the wet oxidation of waste streams using ammonium nitrate as the oxidizing agent. The basic wet oxidation process comprises adding ammonium nitrate or precursors thereof to a waste stream in desired amount to reduce the carbonaceous components to carbon dioxide and the nitrogen components to nitrogen. In our co-pending application there was proposed an improvement for reducing the corrosiveness of waste streams contaminated with sulfur or phosphorous containing compounds, whether organic or inorganic, while maintaining reaction rate. The process comprised: operating said process within a pH from about 1.5 to 8 and preferably within a pH range of from about 1.8 to 4. The improvement residing herein comprises adding organic material to the waste stream to provide acetate ion in a molar ratio from 0.06 to 0.17 moles per mole nitrate or, in the alternative, should the waste stream contain organic material convertible to acetate in the wet oxidation process, maintain a level of organic material sufficient to provide acetate ion in an amount of at least 0.06 moles per mole of nitrate. The addition, or maintenance of organic material convertible to acetate ion acts as a corrosion inhibitor or buffer assisting in reducing corrosion at pH values of 4 and lower.

The process of this invention offers several advantages and they include:

an ability to minimize the corrosiveness of wet air oxidation streams when operating at a low pH, and.

an ability to maintain excellent reaction rates.

DETAILED DESCRIPTION OF THE INVENTION

This invention relates to an improvement in wet oxidation processes involving the destruction of carbonaceous components and nitrogenous components in industrial and municipal wastewater contaminated with sulfur or phosphorus containing components or salts of weak acids and strong bases. The process is a single step wet oxidation process that employs ammonium nitrate or precursor thereof as the oxidizing agent and material convertible to acetate ion. Oxygen gas is not required. The process operates in a pH region between 1.5 and about 8 and preferably within a pH region of from about 1.8–4.

The first step in accomplishing removal of carbonaceous and nitrogenous components to a desirable level requires balancing the oxidation and reduction properties of all of the oxidizable and reducible species present in the wastewater stream. All nitrogen containing species, organic or inorganic, produce substantially only nitrogen and minor amounts of nitrous oxide gas and all carbon containing species produce substantially only carbon dioxide.

One key to pH control in the first step, and to the maintaining of reaction rate during wet oxidation of wastewater streams contaminated with sulfur or phosphorus substances and alkali and alkaline earth metals (designated M), is in the control of the $M/SO_4^{-2}$ and $M/PO_4^{-3}$ ratio (equivalence basis). This is accomplished as follows: contaminants whose anions are of strong acids, e.g., sulfate and phosphates are balanced with alkali or alkaline earth metal: cations and conversely, cations of strong bases are balanced with sulfate or phosphate. The ratio of $M/SO_4^{-2}$ is maintained from 0.1 to 4, preferably 0.2 to 1, most preferably from 0.4 to 0.7 and the ratio of $M/PO_4^{-3}$ of from 0.1 to 2, preferably 0.2 to 0.67 during wet oxidation. Lower ratios, <0.4 for $M/SO_4^{-2}$ may be tolerated when the process effluent designed permits operation with some residual carbon compounds in the effluent. High ratios reduce reaction rate.

The second step of the process involves the balancing of organic species such that on substantial reduction of nitrogen in the wet oxidation process there remains sufficient water soluble, (0.6, preferably >7 g per 100 g water) acetate or carbonaceous material, convertible to acetate ion, to aid in reducing corrosion particularly when the pH is below 4 and more particularly below 2. This is accomplished by providing or preventing the molar ratio acetate to nitrate from falling below 0.06:1.

The second step in the process involves the balancing of organic species such that on substantial reduction of nitrogen in the wet oxidation process there remains sufficient carbonaceous material in solution under the process conditions in the form of e.g., a) acetic acid and/or its derivatives such as esters, amides, salts, etc; or b) carbonaceous compounds that upon oxidation are precursors to acetic acid or its derivatives.

More specifically, the improved method for pH control In the first step and described in our co-pending application comprises maintaining the ratio of $M/SO_4^{-2}$ of from 0.1 to 4, preferably 0.2 to 1.0 and most preferably a ratio of 0.4 to 0.7. A ratio of $M/PO_4^{-3}$ of from 0.1 to 2, preferably 0.2 to 0.67 during the wet oxidation process is used. M is an alkali metal or alkaline earth metal cation and the ratio of $M/SO_4^{-2}$ and $M/PO_4^{-3}$ is. based upon an equivalence basis. By maintaining these ratios, while balancing the reaction such that the carbon species is converted to carbon dioxide and the nitrogen containing species is converted to nitrogen, the corrosiveness of the reaction mixture is reduced and the reaction rate is maintained.

To implement the first step and effect balancing of the components in the waste stream, the waste stream is analyzed for composition using well-known analytical procedures, e.g., ion, gas and liquid chromatography and ICP-AES. First, the carbon content in terms of COD and TOC is determined, particularly if the organic components are difficult to analyze on a component-by-component basis. Ascertaining the quantity of COD test can be accomplished by oxidizing a known volume of the wastewater with potassium dichromate and expressing the result as the weight of oxygen required to oxidize the carbon in the sample to carbon dioxide. Since the COD measures the mg of O2 required to oxidize 1 liter of wastewater containing the reducible species, one only needs to equate this number to the equivalent weight of ammonium nitrate needed to do the same job. There are some cases where a COD measurement will not adequately represent the total amount of reducibles. Certain amines and refractory organics are not readily oxidized by dichromate and thus are not accounted for by the COD measurement. However even if this type of organic is present, the COD measured is a good starting point for determining the amount of ammonium nitrate needed for treatment. If some of the TOC is not oxidized, then the amount of ammonium nitrate added to the influent may be adjusted (an iterative process) until enough is present to oxidize the reducibles to the desired level. Sometimes one may want to operate to completion and sometimes less than completion depending upon the desired effluent specifications.

Once the above analytical analysis of the wastewater is performed, the reduction/oxidation (redox) half reactions for the wet oxidation process can be written. This requires an identification of the oxidizing species and the reducing species. For simplification, the following guidelines may be used:

Those carbon containing species, including those with heteroatoms, where the carbon atom is oxidized on conversion to carbon dioxide are reducing species or agents. Carbon dioxide, bicarbonates, carbonates and the like, which maintain the same oxidation state are not.

Those nitrogen containing species where the nitrogen atom is oxidized on conversion to nitrogen are also reducing species. The ammonium ion is a reducing species.

Those nitrogen containing species where the nitrogen atom is reduced on conversion to nitrogen are oxidizing species. The nitrate and nitrite ions are oxidizing species.

Oxygen gas and peroxy oxygen are oxidizing species.

Any sulfur atom in any organic or inorganic species will change to sulfate ion

Any phosphorus atom in any organic or inorganic species will change to phosphate ion.

Any oxygen atom in any organic or inorganic peroxide species will change to $O^{-2}$, as in water.

The following elements are assumed that the oxidation/reduction state does not change during wet oxidation:

Organo halogen or halide ion

Ether, alcohol and carbonyl oxygen

Alkali and alkaline earth metal cations.

Common metal cations (e.g., generated from materials of construction) in their highest normal oxidation state, e.g., $Fe^{+3}$, $Ni^{+2}$, $Cr^{+3}$, $Al^{+3}$, $Cu^{+2}$, $Zn^{+2}$, etc.

The oxidizing species in the wet oxidation process is ammonium nitrate and precursors thereof. In the process, ammonium nitrate may be added to the wastewater in the desired amount or ammonium nitrate may be added by introducing ammonia or nitric acid, depending upon the extent of the contaminant in the wastewater stream.

The maintenance of pH of the reaction stream is based upon controlling the $M/SO_4^{-2}$ and $M/PO_4^{-3}$ ratio by addition of alkali metal and alkaline earth metals or sulfuric acid or phosphoric acid to the wastewater as required. When the $M/SO_4^{-2}$ ratio or the $M/PO_4^{-3}$ ratio is calculated to fall below specified limits, e.g., preferably not below 0.2, alkali is added. When the ratio exceeds about 1.0 for $M/SO_4^{-2}$, preferably 0.67 for $M/PO_4^{-3}$, sulfate or phosphate are added as ammonium salts or free acids to reduce the pH. A high $M/SO_4^{-2}$ and $M/PO_4^{-3}$ ratio can lead to excessive reaction times.

The alkali and alkaline earth metal source for the wet oxidation is typically a sodium ion although other alkali metals such as lithium, potassium, cesium and so forth may be used. For reasons of efficiency, the alkali metals are added as the oxide or hydroxide. If substantial levels of alkali metal salts of organic substances are added, then the anionic component must be considered in the redox half reaction. When the anion is an oxide or the hydroxide, the anion need not be considered. Alkaline earth metals may be used in the wet oxidation process to provide the M component. However, these metals often form insoluble salts and thus may cause plugging or fouling the reactor. Therefore, in the practice of the process, it is preferred to use Group 1 metals, preferably sodium, to provide the cationic component M.

The second step of the improved wet oxidation process involves analyzing the waste stream to determine the organic content and to determine those components oxidizable to acetate ion. If none exists, acetate must be added to the waste stream to provide the necessary level of acetate corrosion inhibitor, i.e., 0.06 to 0.17 moles per mole of nitrate ion. If organic material convertible to acetate is present, then it is necessary that conditions exist to provide at least 0.06 moles acetate ion per mole of nitrate. Although the alkaline metal addition in the first step is necessary to maintain pH control, there is some corrosion. The membrane of acetate ion in the wet oxidation process reduces corrosion even further at the lower pH.

Acetate providing material includes all forms of acetate, e.g. alkali, alkaline earth and ammonium acetate; alkyl substituted aromatics and the like.

This wet oxidation process operates generally without the use of a catalyst at temperatures near the supercritical temperature of water, i.e., 300 to 400° C., preferably 360 to 374° C. Transition metal catalysts such as those used in wet oxidation processes can be added as need or desired. These metals include V, Cr, Mn, Fe, Co, Ni, Cu, Zn, and Mo.

Pressures are controlled to a high enough pressure to maintain a liquid phase behavior for both the influent and the effluent. If gas phase conditions occur, the salts in the wastewater oxidation product may precipitate and cause plugging of the reactor.

The following examples are provided to illustrate various embodiments and provide rules for guidance to balance the reduction and oxidation half reactions and are not intended to restrict the scope thereof.

COMPARATIVE EXAMPLE 1

Oxidation of Methanol and Nitrobenzene With Ammonium Nitrate

A liter of wastewater contains 1000 ppm methanol (1000 mg/liter) and 25 ppm nitrobenzene (25 mg/liter) is to be oxidized in a wet oxidation process using ammonium nitrate as an oxidizing agent. The half reactions are written to determine the amount of ammonium nitrate needed to convert these materials to $H_2O$, $CO_2$ and $N_2$ in a wet oxidation process.

Oxidation half reaction

1. $CH_3OH + H_2O = CO_2 + 6H^+ + 6\ e^-$
   meq of CH3OH=1000 mg/32 mg/meq=31.25 meq
   meq of electrons produced=31.25×6=187.5 meq
2. $C_6H_5NO_2 + 10H_2O = 6CO_2 + 25H^+ + ½\ N_2 + 25\ e^-$
   meq of nitrobenzene=25 mg/123 mg/meq=0.20325 meq
   meq of electrons produced=0.20325×25=5 meq Adding the two reduction reactions, the total meq of electrons/liter produced by the reducing species=187.5+5.0=192.5 meq/liter Reduction half reaction 1. $NH_4NO_3 + 2\ H^+ + 2\ e^- = N_2 + 3\ H_2O$ The meq of electrons required to reduce 1 mg of $NH_4NO_3$=1 mg/80 (mg/mmole)/2 meq/mmole))=0.025 meq electrons or 0.025 meq/mg of $NH_4NO_3$ Therefore, the weight of $NH_4NO_3$ needed per liter of wastewater=192.5 (meq/liter)/(0.025 (meq/mg)=7,700 mg or 7.7 gms to oxidize one liter of wastewater containing 1000 ppm methanol and 25 ppm nitrobenzene.

COMPARATIVE EXAMPLE 2

Wet Oxidation Of Wastewater Contaminated With Sulfate Ion

A waste stream was analyzed by ion chromatography and by COD analysis and was found to contain the following composition.

| $NH_4^+$ meq/liter | $NO_3^-$ meq/liter | $SO_4^{-2}$ meq/liter | COD mg $O_2$/liter |
|---|---|---|---|
| 146.2 | 25.0 | 121.2 | 1500 |

The objective here was to demonstrate a method for maintaining the pH in the influent and the effluent between about 2 and 8 by appropriate balancing of anions and cations through addition of a reducing agent or oxidizing agent, whichever was needed.

Oxidation half reactions

1. $NH_4^+ = ½\ N_2 + 4\ H^+ + 3\ e^-$
   Therefore, 146.2 meq $NH_4^+$ yields 3×146.2 or 438.6 meq of electrons.
2. COD 1500 mg O2/liter is converted to meq of electrons.
   1500×0.125 meq electrons/mg O2=187.5 meq electrons.
   Total reduction electrons=438.6+187.5=626.1 meq electrons.

Oxidation Half Reaction

1. $NO_3^- + 6\ H^+ + 5\ e^- = ½\ N_2 + 3\ H_2O$
   25 meq $NO_3^-$×5 meq e/meq $NO_3^-$=125 meq electrons required for $NO_3^-$.

The electron differential between the reduction and oxidation half reactions is the addition product of the reactions, specifically 626.1 meq available minus 125 meq=501.1 meq electron excess. Thus, 501.1 meq electrons of oxidizer are required to meet the required stoichiometry.

To balance the oxidation/reduction requirements, more nitrate ion is required. Since one equivalent of nitrate ion requires 5 equivalents of electrons to become reduced to nitrogen, 100.2 meq of nitrate ion are required.

To maintain the pH in the appropriate range of 2 to 8 the $M/SO_4^{-2}$ ratio needs to be in the range of from 0.1 to 4, preferably 0.4 to 1. The amount of alkali or alkaline earth metal thus is 24.24 to 121.2 meq to satisfy the sulfate ion present. Since the 100.2 meq of nitrate ion needs an equivalent amount of a cation, using 100.2 meq of sodium ion satisfies both the redox and the amount of alkali metal/sulfate ion requirements. Thus, 8.52 g of $NaNO_3$ are added.

EXAMPLE 3

Wet Oxidation Of Sulfur Containing Waste Stream With Acetate Control And Without Alkali Metal A sample of synthetic wastewater was prepared according to the following procedure: ammonium nitrate (43.41 g, 0.54 mole) was dissolved together with ammonium sulfate (42.85 g, 0.32 mole) and ammonium acetate (9.54 g, 0.12 mole) in 2900 ml of water. The acidic solution (pH=2.9) gave the following composition:

Inorganics (ppm):

| Nitrate | Ammonia | Sulfate | Sodium |
|---------|---------|---------|--------|
| 11,393  | 7,948   | 13,126  | 0      |

Organics (ppm):

| Acetate | TOC   | COD   |
|---------|-------|-------|
| 1,895   | 1,205 | 2,300 |

Redox balance according to Example 1.
  Potential nitrate removal by ammonia 17,173 ppm nitrate 150%
  Potential nitrate removal by acetate ion 3,186 ppm nitrate 28%
  Total potential nitrate removal: 20,359 ppm nitrate 178%
  The % potential nitrate removals were calculated based on the full conversion of organic carbon to carbon dioxide and organic/inorganic nitrogen to nitrogen gas. An excess of ammonia was added to maximize nitrate ion removal.
  Other parameters:

| $Na/SO_4^{-2}$ ratio | $NH_4/NO_3$ ratio | Residence time (min) | Temperature (° C.) |
|---|---|---|---|
| 0 | 2.54 | 40 | 370 |

The feed was thermally treated for 40 minutes by the wet oxidation process to give a yellowed color effluent with variable pH (range from 2.4–8.3) depending on the fraction collected. This large variation in pH suggested unacceptable process control of reaction conditions and the high levels of transition metals (Fe and Mo) present in the effluent, shown below, suggested excessive corrosion. Analysis of the inorganic and organic species present in the effluent can be seen below:

Inorganics (ppm):

| Nitrate | Ammonia | Sulfate | Sodium |
|---------|---------|---------|--------|
| 0       | 4,572   | 11475   | 0      |

Heavy Metals (ppm):

| Iron | Chromium | Nickel | Molybdenum |
|------|----------|--------|------------|
| 43   | 0.4      | <0.1   | ≦3.5       |

Organics (ppm):

| Acetate | TOC | COD |
|---------|-----|-----|
| 5       | 197 | 108 |

The results show that corrosion is too high when the process uses acetate control alone. Extensive corrosion (43 ppm Fe and 3.5 ppm Mo) took place even though acetate ion was added to prevent it. The wet oxidation process also requires the presence of sodium ions or any other alkali or alkali earth metal ions to balance the sulfate, which converts to sulfuric acid under wet oxidation conditions.

EXAMPLE 4

Effect of Acetate In Wet Oxidation of Acidic Feed

The following samples of synthetic wastewater were prepared according to the following procedures in an effort to consider corrosion effect with feeds of varying acidity:

Run 1: ammonium nitrate (70.85 g, 0.885 mole) was dissolved together with ammonium sulfate (1.62 g, 12.2 mmole) in 4637 ml of water. To this solution, ammonium hydroxide (5 N solution in water) (82.5 ml, 0.41 mole), sodium hydroxide (5.0 N) (126 ml, 0.63 mole), sulfuric acid (96%) (55.8 g, 0.546 mole), dinitrobenzoic acid (9.94 g, 46.9 mmole) and dinitrocresol (0.56 g, 2.82 mmole) were added to give a deep yellow solution with a pH of 5.5.

Run 2: ammonium nitrate (70.85 g, 0.885 mole) was dissolved together with ammonium sulfate (13.82 g, 0.105 mole) in 4662 ml of water. To this solution, ammonium hydroxide (5 N solution in water) (51.7 ml, 0.258 mole), sodium hydroxide (5.0 N) (135 ml, 0.675 mole), sulfuric acid (96%) (47.8 g, 0.47 mole), dinitrobenzoic acid (9.91 g, 46.7 mmole) and dinitrocresol (0.56 g, 2.82 mmole) were added to give a deep yellow solution with a pH of 2.39.

Run 3: ammonium nitrate (70.93 g, 0.886 mole) was dissolved together with ammonium sulfate (1.76 g, 13.3 mmole) and ammonium acetate (41.43 g, 0.54 mole) in 4665 ml of water. To this solution, ammonium hydroxide (5 N solution in water) (81 ml, 0.405 mole), sodium hydroxide (5.0 N) (125 ml, 0.625 mole), sulfuric acid (96%) (53 g, 0.52 mole), dinitrobenzoic acid (11.53 g, 54.4 mmole) and dinitrocresol (0.55 g, 2.77 mmole) were added to give a deep yellow solution with a pH of 5.4.

These synthetic wastewaters were analyzed to give the following compositions (ppm):

| Run # | Nitrate | Ammonia | Sulfate | Sodium | DNBA | DNOC | Acetate | TOC | COD |
|---|---|---|---|---|---|---|---|---|---|
| 1 | 9,548 | 4,755 | 9,714 | 2,674 | 1,290 | 98 | 0 | 797 | 2,280 |
| 2 | 9,582 | 4,185 | 10,180 | 2,799 | 1,401 | 100 | 0 | 797 | 2,256 |
| 3 | 11,817 | 7,439 | 11,264 | 2,918 | 1,915 | 102 | 6,754 | 3,780 | 10,270 |

An excess of reducing agent was present in all the synthetic feeds with the purpose of maximizing nitrate removal. The potential nitrate removal from ammonia and organic waste is seen in the following table:

| Run # | % Pot. $NO_3$ removal organic | % Pot. $NO_3$ removal $NH_3$ | % Total |
|---|---|---|---|
| 1 | 17.0 | 107 | 124 |
| 2 | 18.6 | 95.5 | 114 |
| 3 | 117.0 | 137 | 254 |

Samples were thermally treated by the wet oxidation process to give effluents with the following compositions (ppm):

| Run # | Nitrate | Ammonia | Sulfate | Sodium | % $NO_3$ Removed | Acetate | TOC | COD |
|---|---|---|---|---|---|---|---|---|
| 1 | 727 | 1,478 | 9,714 | 2,674 | 92.4 | 0 | 16 | 26 |
| 2 | 986 | 1,209 | 10,180 | 2,799 | 89.7 | 0 | 11 | 15 |
| 3 | 1,317 | 4,536 | 11,264 | 2,918 | 89.7 | 3,039 | 1,886 | 4,175 |

Some of the reaction parameters for every individual run can be seen in the following table:

| Run # | $Na/SO_4^{-2}$ | $NH_4/NO_3$ | RT (min) | Temp (° C.) | Influent pH | Effluent pH |
|---|---|---|---|---|---|---|
| 1 | 0.57 | 1.81 | 40 | 370 | 5.50 | 2.2 |
| 2 | 0.57 | 1.60 | 40 | 370 | 2.40 | 2.2 |
| 3 | 0.54 | 2.29 | 40 | 370 | 5.50 | 7.7 |

The effluents were also analyzed for iron, chromium, nickel and molybdenum to monitor the extend of corrosion in every individual run (ppm):

| Run # | Fe | Cr | Ni | Mo |
|---|---|---|---|---|
| 1 | 0.11 | 14.1 | 1.36 | 1.78 |
| 2 | 0.15 | 9.63 | 1.20 | 1.30 |
| 3 | 0.06 | <0.02 | 0.8 | 0.36 |

From the data presented above, it can be concluded that when ammonia is the predominant reducing agent, the pH of the effluent water is going to be lower than that of the influent wastewater due to sulfuric acid formation. However, in the presence of 0.06 to 0.17 moles acetate per mole nitrate, the pH of the treated water may not necessarily decrease. In particular, Run #3 gave an effluent with a higher pH than the influent wastewater. Therefore, the presence of acetate ion in combination with the alkali metal in the wastewater assisted in preventing the pH from dropping to very low values during the course of the reaction.

Also, the effect of acetate ion on the wet oxidation process was shown. The runs that were done in the absence of acetate gave acidic effluents containing higher concentration of transition metal corrosion products even though the runs were at similar pH to those with acetate ion.

EXAMPLE 5

Effect of Acetate Absence on Acidic Feed And Effluent pH

A series or runs were conducted in an effort to determine the effect of acetate ion on the pH of wastewater in a wet oxidation process.

Run 1: A sample of synthetic wastewater was prepared according to the following procedure: ammonium nitrate (45.61 g, 0.57 mole) was. dissolved together with ammonium sulfate (8.86 g, 67.1 mmole), DNBA (6.348 g, 30.0 mmole), DNOC (0.32 g, 1.61 mmole) and ammonium hydroxide (32.0 g, 5 N solution, 0.166 mole) and sulfuric acid (67.1 g, 12 N solution, 0.3 mole) in 3000 ml of water. The pale yellow solution was adjusted to pH=6.5 with a 5 N solution of sodium hydroxide (114.8 g, 5 N solution).

Run 2: the same synthetic feed from Run #1 was adjusted to pH=2.5 with a 5 N solution of sodium hydroxide (105.5 g, 5 N solution).

Analyses of these samples is shown below:

Inorganics (ppm):

| Run # | Chloride | Nitrite | Nitrate | Ammonia | Sulfate | Sodium |
|---|---|---|---|---|---|---|
| 1 | 0 | 0 | 10,727 | 4,717 | 11,062 | 4,160 |
| 2 | 0 | 0 | 10,761 | 4,531 | 10,875 | 3,701 |

Organics (ppm):

| Run # | Acetate | 2,4-DNBA | 4,6-DNOC | TOC | COD |
|---|---|---|---|---|---|
| 1 | 0 | 2,321 | 125 | 763 | 2,278 |
| 2 | 0 | 2,184 | 124 | ND | ND |

The feed was almost redox balanced with the following potential for nitrate removal distribution:

| Run # | % Pot. $NO_3$ removal organic | % Pot. $NO_3$ removal $NH_3$ | % Total |
|---|---|---|---|
| 1 | 23 | 96 | 119 |
| 2 | 25 | 92 | 117 |

Other parameters:

| Run # | $Na/SO_4^{-2}$ | $NH_4/NO_3$ | RT (min) | Temp. (° C.) | Inf. pH | Eff. pH |
|---|---|---|---|---|---|---|
| 1 | 0.78 | 1.6 | 30 | 370 | 6.5 | 2.2 |
| 2 | 0.71 | 1.53 | 30 | 370 | 2.5 | 2.0 |

The feed was thermally treated for 30 minutes by the wet oxidation process to give, in both cases, a deep yellow colored effluent.

Inorganics (ppm):

| Run # | Nitrate | Ammonia | Sulfate | Sodium |
|---|---|---|---|---|
| 1 | 787 | 1,196 | 11,062 | 4,160 |
| 2 | 1080 | 1,118 | 10,875 | 3,982 |

Heavy Metals (ppm):

| Run # | Fe | Cr | Ni | Mo |
|---|---|---|---|---|
| 1 | <0.17 | 77.3 | 3.10 | 3.52 |
| 2 | <0.15 | 122 | 4.89 | 5.47 |

Organics (ppm):

| Run # | Acetate | 2,4-DNBA | 4,6-DNOC | TOC | COD |
|---|---|---|---|---|---|
| 1 | 0 | 0 | 0 | 36 | 108 |
| 2 | 0 | 0 | 0 | 31 | 93 |

This example shows that when the wet oxidation process is carried out in the absence of acetate ion, the pH of the effluent is lower than the influent. Although good TOC (95%) and nitrate (~90%) removal were obtained the heavy metal content in the effluent was higher to that typically acceptable for discharge into the environment (typically 10 ppm of total heavy metals or less). Corrosion was more severe when the pH of the feed was already acidic and consequently this represented a limitation in the process because maximum nitrate removal can only be accomplished at low pH.

EXAMPLE 6

Effect of Acetate and Sulfate on TOC and $NO_3$ Removal

A sample of synthetic wastewater was prepared according to the following procedure: ammonium nitrate (61.15 g, 0.76 mole) was dissolved together with ammonium sulfate (6.55 g, 0.05 mole), ammonium acetate (1.54 g, 0.02 mole), sodium acetate (3.23 g, 0.023 mole), DNBA (3.05, 14.4 mmole), DNOC (2.53 g, 12.7 mmole) and sodium hydroxide (25.8 ml of 1 N solution, 25.8 mmole) in 3000 ml of water to give an almost neutral yellow solution (pH=6.7). Analysis of this sample showed the following concentrations:

Inorganics (ppm):

| Nitrate | Ammonia | Sulfate | Sodium |
|---|---|---|---|
| 16,978 | 5,550 | 1,250 | 360 |

Organics (ppm):

| Acetate | 2,4-DNBA | 4,6-DNOC | TOC | COD |
|---|---|---|---|---|
| 626 | 1,004 | 805 | 1,158 | 2,200 |

The feed was almost redox balanced with the following potential for nitrate removal distribution:

Potential nitrate removal from ammonia 10,592 ppm nitrate 69.4%

Potential nitrate removal from organics 3,770 ppm nitrate 24.7%

Total potential nitrate removal: 14,362 ppm nitrate 94.1%

Other parameters:

| $Na/SO_4^{-2}$ | $NH_4/NO_3$ ratio | Residence time (min) | Temperature (° C.) |
|---|---|---|---|
| 0.6 | 1.15 | 30 | 370 |

The feed was thermally treated for 30 minutes by the wet oxidation process to give an acidic clear effluent (pH=2.1).

Inorganics (ppm):

| Nitrate | Ammonia | Sulfate | Sodium |
|---|---|---|---|
| 122 | 199 | 1,221 | 360 |

Heavy Metals (ppm):

| Iron | Chromium | Nickel | Molybdenum |
|---|---|---|---|
| 0.19 | 0.24 | ND | ND |

Organics (ppm):

| Acetate | 2,4-DNBA | 4,6-DNOC | TOC | COD |
|---------|----------|----------|-----|-----|
| 36 | 0 | 0 | 19 | 160 |

From the results above, when the reducing and oxidizing species are balanced, removal of TOC and nitrate ion can be accomplished effectively when the sulfate concentrations are low. This example also shows that at low sulfate concentration (1250 ppm) excellent TOC removal (98.3%) and nitrate destruction (99.3% removal) can be accomplished. It is important to note that the pH of the influent was not very corrosive (pH=6.7). Acetate is acting mainly as a reducing agent in the nitrate removal process and not a corrosion inhibitor. The corrosion here is mostly controlled by the alkali metal.

EXAMPLE 7

Effect of High Sulfate In Waste Stream

A sample of synthetic wastewater was prepared according to the following procedure: ammonium nitrate (59.0 g, 0.74 mole) was dissolved together with DNBA (9.0, 42.4 mmole), sodium sulfate (28.0 g, 0.21 mole), ammonia (8.26 g of 30% solution, 2.48 mole) and sulfuric acid (11.8 g 98%, 0.12 mole) in 3000 ml of water. The acidic solution (pH=2.0) was analyzed as shown below:

Inorganics (ppm):

| Nitrate | Ammonia | Sulfate | Sodium |
|---------|---------|---------|--------|
| 14,773 | 5,348 | 9,807 | 2,914 |

Organics (ppm):

| Acetate | 2,4-DNBA | 4,6-DNOC | TOC | COD |
|---------|----------|----------|-----|-----|
| 1,069 | ND | 0 | 1,158 | 3,185 |

The feed was almost redox balanced with the following potential for nitrate removal distribution:

| | | |
|---|---|---|
| Potential nitrate removal from ammonia | 11,702 ppm nitrate | 79% |
| Potential nitrate removal from organics | 3,510 ppm nitrate | 24% |
| Total potential nitrate removal: | 15,212 ppm nitrate | 103% |

Other parameters:

| $Na/SO_4^{-2}$ ratio | $NH_4/NO_3$ ratio | Residence time (min) | Temperature (° C.) |
|---|---|---|---|
| 0.62 | 1.32 | 30 | 370 |

The feed was thermally treated for 30 minutes by the wet oxidation process to give a pale yellow acidic clear effluent (pH=1.8).

Inorganics (ppm):

| Nitrate | Ammonia | Sulfate | Sodium |
|---------|---------|---------|--------|
| 1,194 | 518 | 9,807 | 2,914 |

Heavy Metals (ppm):

| Iron | Chromium | Nickel | Molybdenum |
|------|----------|--------|------------|
| 0.38 | 3.41 | 1.10 | ND |

Organics (ppm):

| Acetate | 2,4-DNBA | 4,6-DNOC | TOC | COD |
|---------|----------|----------|-----|-----|
| 26 | ND | ND | 16 | 45 |

This example shows that with high sulfate concentrations (~10,000 ppm) in the feed, the wet oxidation process can still remove most of the TOC effectively. However, nitrate removal becomes more difficult and, under redox balance, high levels of nitrate are still present in the effluent (~1000 ppm). This example also shows that when the influent contains high sulfate concentrations (i.e., 9800 ppm), then the % nitrate removal decreases (1194 ppm, 91.9%) as compared to low sulfate streams. Comparison between Examples 6 and 7 (99.3% and 91.9% nitrate removal respectively) shows that sulfate indeed inhibits the nitrate destruction process.

EXAMPLE 8

Effect of Ammonia on pH

The following samples of synthetic wastewater were prepared according to the following procedures:

Run 1: ammonium nitrate (63.17 g, 0.79 mole) was dissolved together with ammonium sulfate (7.27 g, 55.1 mmole) and sodium acetate trihydrate (16.10 g, 122 mmole) in 3000 ml of water. To this solution, ammonium hydroxide (5 N solution in water) (26.1 ml, 0.130 mole), sodium hydroxide (5.0 N) (20 ml, 0.1 mole), sulfuric acid (12 N solution) (37.7 ml, 0.2262 mole), dinitrobenzoic acid (7.17 g, 33.82 mmole) and dinitrocresol (0.34 g, 1.71 mmole) were added to give a deep yellow solution with a pH of 1.50.

Run 2: ammonium nitrate (40.0 g, 0.5 mole) was dissolved together with ammonium sulfate (7.25 g, 54.9 mmole) and. sodium acetate trihydrate (8.04 g, 61 mmole) in 3000 ml of water. To this solution, ammonium hydroxide (5 N solution in water) (26.5 ml, 0.132 mole), sodium hydroxide (5.0 N) (20 ml, 0.1 mole), sulfuric acid (12 N solution) (32.2 ml, 0.1932 mole), dinitrobenzoic acid (7.25 g, 34.2 mmole) and dinitrocresol (0.37 g, 1.86 mmole) were added to give a deep yellow solution with a pH of 1.8.

Run 3: ammonium nitrate (40.09 g, 0.5 mole) was dissolved together with ammonium sulfate (7.3 g, 55.3 mmole) and sodium acetate trihydrate (5.07 g, 38.4 mmole) in 2952 ml of water. To this solution, ammonium hydroxide (5 N solution in water) (28.2 ml, 0.141 mole), sodium hydroxide (5.0 N) (20 ml, 0.1 mole), sulfuric acid (44%) (41.4 g, 0.18 mole), sodium sulfate (7.71 g, 58.4 mmole), dinitrobenzoic acid (7.20 g, 33.9 mmole) and dinitrocresol (0.34 g, 1.7 mmole) were added to give a deep yellow solution with a pH of 1.9.

Run 4: same synthetic water as Run #2 but thermally treated for 30 minutes (retention time=30 minutes).

Run 5: ammonium nitrate (40.68 g, 0.5 mole) was dissolved together with ammonium sulfate (7.78 g, 59.0 mmole) and sodium acetate trihydrate (4.06 g, 30 mmole) in 2970 ml of water. To this solution, ammonium hydroxide (5 N solution in water) (24.6 ml, 0.123 mole), sodium hydroxide (5.0 N) (20 ml, 0.1 mole), sulfuric acid (44%) (23.6 g, 0.1 mole), dinitrobenzoic acid (7.10 g, 33.5 mmole) and dinitrocresol (0.38 g, 1.9 mmole) were added to give a deep yellow solution with a pH of 1.9.

Run 6: same synthetic water as Run #5 but thermally treated for 30 minutes (retention time=30 minutes).

The synthetic wastewaters were analyzed for organic and inorganic components (ppm):

| Run # | Nitrate | Ammonia | Sulfate | Sodium | DNBA | DNOC | Acetate | TOC | COD |
|---|---|---|---|---|---|---|---|---|---|
| 1 | 15,108 | 6,873 | 16,849 | 2,283 | 1,802 | 93 | 2,074 | ND | ND |
| 2 | 9,676 | 3,900 | 7,810 | 1,124 | 1,844 | 102 | 1,403 | 1,694 | 3,800 |
| 3 | 9635 | 4,665 | 8,527 | 1,839 | 1,855 | 103 | 939 | 1,520 | 3,425 |
| 4 | 9676 | 3,900 | 7,810 | 1,124 | 1,844 | 102 | 1,403 | 1,694 | 3,800 |
| 5 | 10,160 | 4,489 | 6,330 | 884 | 1,920 | 104 | 636 | 1433 | 3,075 |
| 6 | 10,160 | 4,489 | 6,330 | 884 | 1,920 | 104 | 636 | 1433 | 3,075 |

An excess reducing agent is present in all the synthetic feeds with the purpose of maximizing nitrate removal. The potential nitrate removal from ammonia and organic can be seen in the following table:

| Run # | % Pot. $NO_3$ removal organic | % Pot. $NO_3$ removal $NH_3$ | % Total |
|---|---|---|---|
| 1 | 37.5 | 99.5 | 137 |
| 2 | 47.6 | 88.4 | 136 |
| 3 | 40.4 | 106 | 146.4 |
| 4 | 48 | 88 | 136 |
| 5 | 96.7 | 31.5 | 128.2 |
| 6 | 96.7 | 31.5 | 128.2 |

Samples were thermally treated by the wet oxidation process to give effluents with the following compositions (ppm):

| Run # | Nitrate | Ammonia | Sulfate | Sodium | DNBA | DNOC | Acetate | TOC | COD |
|---|---|---|---|---|---|---|---|---|---|
| 1 | 552 | 3,422 | 16,849 | 2,283 | 0 | 0 | 749 | ND | ND |
| 2 | 294 | 1,490 | 7,810 | 1,124 | 0 | 0 | 288 | 188 | 464 |
| 3 | 985 | 2,057 | 8,257 | 1,839 | 0 | 0 | 146 | 112 | 284 |
| 4 | 110 | 1,743 | 7,810 | 1,124 | | | 257 | 150 | 330 |
| 5 | 630 | 1,266 | 6,330 | 884 | 0 | 0 | 42 | 57 | 169 |
| 6 | 215 | 1,611 | 6,330 | 884 | 0 | 0 | 0 | 27 | 62 |

Some of the reaction parameters for every individual run can be seen in the following table:

| Run # | $Na/SO_4$ | $NH_4/NO_3$ | RT (min) | Temp. (° C.) | Influent pH | Effluent pH |
|---|---|---|---|---|---|---|
| 1 | 0.28 | 1.65 | 20 | 370 | 1.5 | 2.2 |
| 2 | 0.30 | 1.46 | 20 | 370 | 1.8 | 2.2 |
| 3 | 0.45 | 1.76 | 20 | 370 | 1.9 | 2.1 |
| 4 | 0.30 | 1.46 | 30 | 370 | 1.8 | 2.2 |
| 5 | 0.29 | 1.6 | 20 | 370 | 1.9 | 2.3 |
| 6 | 0.29 | 1.6 | 30 | 370 | 1.9 | 2.3 |

The effluents were also analyzed for iron, chromium, nickel and molybdenum to monitor the extend of corrosion in every individual run (ppm):

| Run # | Fe | Cr | Ni | Mo |
|---|---|---|---|---|
| 1 | 5.93 | 0.72 | 3.66 | <0.30 |
| 2 | 1.06 | <0.07 | 0.89 | <0.30 |
| 3 | 0.31 | <0.07 | 1.0 | <0.17 |

-continued

| Run # | Fe | Cr | Ni | Mo |
|---|---|---|---|---|
| 4 | 3.68 | <0.05 | 1.0 | <0.17 |
| 5 | <0.12 | 0.1 | 0.90 | <0.17 |
| 6 | <0.12 | 0.23 | 0.85 | <0.17 |

These examples show that when using excess ammonia, low levels of nitrate and TOC can be obtained in the effluent after a relatively short period of thermal treatment (~30 minutes). However, using this approach requires subsequent removal of the ammonia excess from the effluent. In addition, excess ammonia and low pH causes the sodium/sulfate ratio to be lower than one.

The use of acetate ion under these conditions (1.5<pH<2.5 and 0.4<$Na/SO_4$<1) prevented the pH to decrease even further avoiding corrosion of the stainless steel reactor. For example, Run #4 shows a reduction in the nitrate removal from 9676 ppm to 110 ppm (98.8% nitrate removal). Similarly, Run #1 shows a nitrate reduction from 15,108 to 552 (96.3% removal). Notice that the pH of both influent waste steams were very low (for Run #1 pH=1.5 and for Run #4 pH=1.8). The results of these runs also shows a very low corrosion rate: <10.6 ppm total heavy metals for #1 and <4.9 ppm total heavy metals for Run #4.

These results should also be compared to the ones in Example 5 for Runs #1 and #2. In those Runs (#1 & #2), the influent pHs were 6.5 (#1) and 2.2 (#2) giving more acidic effluents with pHs of 2.2 (#1) and 2.0 (#2). However, because the wastewaters contained no acetate, the concentrations of total heavy metals in these effluents were high: 84 ppm for Run #194 and 132 ppm for Run #2. In contrast, Runs #1 and 3–6 of this Example 8 had influent pHs in the range 1.5–1.9 but the effluents had always pHs above this range. Finally, the corrosion inhibition properties of acetate cannot be attributed solely to its effect on the pH. For Example 8, Run #3 and Example 5, Run #2 are essentially carried out under comparable pHs:

| Run # | Influent pH | Effluent pH |
|---|---|---|
| Example 8 | 3 1.9 | 2.1 (no corrosion) |
| Example 5 | 2 2.5 | 2.0 (corrosion) |

EXAMPLE 9

Effect of Acetate On Heavy Metal Content In Waste Stream

A series of Runs from the above Examples were tabulized to determine the effect of acetate ion concentration in the waste stream during wet oxidation.

Example 4, Run #3 shows the results obtained, in the presence and in the absence of acetate ion, when treating wastewaters having the same acidity. The almost neutral effluent from Example 4, Run #3 showed lower levels of heavy metals indicating less corrosion.

Note that low levels of heavy metals are obtained in the presence of acetic acid even in cases where the sodium/sulfate ratio is close to 1 (Example 5, Run #1 vs Example 7, Run 1). Therefore, acetate can be used together with sodium ions as an aid to prevent corrosion. Furthermore, low levels of heavy metals are also shown for cases containing acetic acid and $Na^+/SO_4^{-2}<1$. Finally, the data shows that in the presence of acetate, the pH of the effluent tends to slightly increase (i.e., Example 4, Run #3 and Example 8, Runs #1–6) but not at the expense of corroding the reactor.

EXAMPLE 9

Effect of various Organic Acids On Corrosion

A series of runs was conducted to compare the effect of various acids to the acetate ion. Specifically, propionic, 2,4-dinitrobenzoic acid and formic acid were compared to acetic acid.

The following samples of synthetic wastewater were prepared according to the following procedures:

Run 1: ammonium nitrate (14.13 g, 0.176 mole) was dissolved together with DNBA (3.0 g, 9.43 mmole) and sulfuric acid (22.7 g, 12 N solution, 0.1 mole) in 1000 ml of water. To this solution. acetic acid (3.52 g, 58.6 mmole) and sodium hydroxide (35.7 g, 5 N solution) were added to give a yellow solution with a pH of 1.7.

Run 2: ammonium nitrate (14.13 g, 0.176 mole) was dissolved together with DNBA (3.0 g, 9.43 mmole) and

| Ex. | Run # | $NH_4/NO_3^-$ | $Na^+/SO_4^{-2}$ | $AcO^-/NO_3$ | Fe | Cr | Ni | Mo | Total | $pH_{in}$ | $pH_{eff}$ |
|---|---|---|---|---|---|---|---|---|---|---|---|
| 3 | 1 | 2.54 | 0 | 0.170 | 43 | 0.4 | <0.1 | <0.35 | 44 | 2.9 | 2.2 |
| 4 | 1 | 1.81 | 0.57 | 0.000 | 0.11 | 14.1 | 1.36 | 1.78 | 17.4 | 5.5 | 2.2 |
| 4 | 2 | 1.60 | 0.57 | 0.000 | 0.15 | 9.63 | 1.20 | 1.30 | 12.3 | 2.4 | 2.2 |
| 4 | 3 | 2.29 | 0.55 | 0.600 | 0.06 | 0.02 | 0.8 | 0.36 | 1.24 | 5.5 | 7.7 |
| 5 | 1 | 1.60 | 0.78 | 0.000 | <0.17 | 77.3 | 3.10 | 3.52 | 84.1 | 6.5 | 2.2 |
| 5 | 2 | 1.53 | 0.71 | 0.000 | <0.15 | 122 | 4.89 | 5.47 | 132.5 | 2.5 | 2.0 |
| 6 | 1 | 1.15 | 0.60 | 0.040 | 0.19 | 0.24 | ND | ND | ~0.5 | 6.7 | 2.1 |
| 7 | 1 | 1.32 | 0.62 | 0.076 | 0.38 | 3.41 | 1.10 | ND | ~5 | 2.0 | 1.8 |
| 8 | 1 | 1.65 | 0.28 | 0.140 | 5.93 | 0.72 | 3.66 | <0.30 | 10.6 | 1.5 | 2.2 |
| 8 | 2 | 1.46 | 0.30 | 0.150 | 1.06 | <0.07 | 0.89 | <0.30 | 2.3 | 1.8 | 2.2 |
| 8 | 3 | 1.76 | 0.45 | 0.100 | 0.31 | <0.07 | 1.0 | <0.17 | 1.55 | 1.9 | 2.1 |
| 8 | 4 | 1.46 | 0.30 | 0.150 | 3.68 | <0.05 | 1.0 | <0.17 | 4.9 | 1.8 | 2.2 |
| 8 | 5 | 1.60 | 0.29 | 0.0650 | <0.12 | 0.10 | 0.90 | <0.17 | 1.3 | 1.9 | 2.3 |
| 8 | 6 | 1.60 | 0.29 | 0.0650 | <0.12 | 0.23 | 0.85 | <0.17 | 1.4 | 1.9 | 2.3 |

In this Example, the acetate/nitrate, sodium/sulfate and ammonium/nitrate ratios typically used were evaluated. The above table shows that, under similar conditions, the runs carried out in the presence of acetate ion have a much lower heavy metals content than the experiments carried out in the absence of acetate. The data in the table below shows that, in the absence of sodium ion, extensive corrosion of the reactor occurs as evidenced by the high content of heavy metals (ppm) in the effluent stream (Example 3, Run #1). However, when sodium ions were present, the corrosion was much less severe having acceptable levels. The corrosiveness of the liquid waste can be controlled when the sodium/sulfate ratios are within the range of 1 to about 2. However, lower sodium/sulfate ratios (0.4 to about 2) are also acceptable provided that a corrosion inhibitor is present in the wastewater. Comparison between Example 4, Run #1 and sulfuric acid (22.7 g, 12 N solution, 0.1 mole) in 1000 ml of water. To this solution, propionic acid (4.35 g, 62 mmole) and sodium hydroxide (36.3 g, 5 N solution) were added to give a yellow solution with a pH of 1.7.

Run 3: ammonium nitrate (14.13 g, 0.176 mole) was dissolved together with DNBA (15.47 g, 73 mmole) and sulfuric acid (22.4 g, 12 N solution, 0.1 mole) in 1000 ml of water. The solution was adjusted to a pH of 1.7 with sodium hydroxide (42.7 g, 5 N solution).

Run 4: ammonium nitrate (14.14 g, 0.176 mole) was dissolved together with DNBA (2.0 g, 9.4 mmole), formic acid (2.71 g, 58.9 mmole) and sulfuric acid (22.75 g, 12 N solution, 0.1 mole) in 1000 ml of water. The solution was adjusted to a pH of 1.7 with sodium hydroxide (42.8 g, 5 N solution).

Analysis (ppm):

| Run # | Nitrate | Ammonia | Sulfate | Sodium | pH |
|---|---|---|---|---|---|
| 1 | 10,169 | 2,106 | 9,251 | 4,195 | 1.7 |
| 2 | 10,199 | 2,106 | 9,335 | 4,514 | 1.7 |
| 3 | 10,143 | ND | 9,129 | ND | 1.7 |
| 4 | 10,104 | ND | 9,146 | ND | 1.7 |

| | Inhibitor Concentration | | | |
|---|---|---|---|---|
| Run # | Acetic acid | Propionic acid | 2,4-Dinitrobenzoic acid | Formic acid |
| 1 | 3,431 | 0 | 1,497 | 0 |
| 2 | 0 | 3,426 | 1,488 | 0 |
| 3 | 0 | 0 | 4,367 | 0 |
| 4 | 0 | 0 | ND | 5,791 |

| Run # | Nitrate | Ammonia | Sulfate | Sodium | pH |
|---|---|---|---|---|---|
| 1 | 2,126 | 747 | 9,251 | 4,195 | 2.4 |
| 2 | 1,320 | 836 | 9,335 | 4,514 | 2.3 |
| 3 | 1,640 | ND | 9,129 | ND | 2.2 |
| 4 | 1,951 | ND | 9,146 | ND | 2.2 |

| Run # | Inhibitor | Fe | Cr | Ni | Mo |
|---|---|---|---|---|---|
| 1 | Acetic Acid | <0.07 | <0.02 | <0.35 | <0.47 |
| 2 | Propionic Acid | 0.88 | <0.02 | <0.35 | <0.37 |
| 3 | 2,4-DNBA | 0.31 | <0.02 | <0.35 | <0.37 |
| 4 | Formic Acid | <0.07 | 53.1 | 1.94 | 2.42 |

Thus, thermally robust corrosion inhibitors such as acetic acid, propionic acid or DNBA are most efficient, while others that are more labile under the strong oxidizing conditions (i.e., formic acid) are not so efficient. However, propionic acid was not as effective as acetate. In the case of DNBA, its efficiency may be due to the formation of some acetic acid during its oxidative degradation. This was evidenced by the detection of acetate ion in the effluent obtained after thermal treatment of the synthetic feed from run 200 that contained only DNBA as an organic component.

It is believed the data show that the presence of acetate ion in the wet oxidation process acts as a corrosion inhibitor. For example, the total heavy metal contents for run that were carried out in the absence of acetate (e.g., Example 4, Runs #1 and 2 and Example 8, Runs #1 and 2) are above or well above 10 ppm.

The presence of acetate is particularly useful when treating strongly acidic waste streams. Since the nitrate destruction process is acid catalyzed, best reaction rates are obtained at low pH. Strongly acidic waste streams have low sodium/sulfate ratios (significantly lower than 1) either because there is excess sulfuric acid or because less alkali oxide or hydroxide is added to obtain a low pH. Also, when treating nitrate-containing acidic waste streams with excess of ammonia, less alkali oxide/hydroxide is added to obtain a low pH causing the sodium/sulfate ratio to decrease even more. Thus, under these circumstances, the alkali metal may not be sufficient to provide the optimum corrosion control.

Waste streams having low sodium/sulfate ratios ranging from 0.28 to 0.45, despite the fact that the sodium/sulfate ratios were low, showed no significant corrosion was measured due to the presence of acetate (total heavy metal for these runs were from 10 ppm to about 1 ppm). In contrast, Example 5, Runs #1 and 2 showed more corrosion despite the fact that the sodium/sulfate ratios were still higher (range from 0.71 to 0.78). Finally, it is important to mention that sodium is also essential in minimizing corrosion as demonstrated in Example 1.

Summary. Nitrate destruction with ammonia is best carried out under strongly acidic conditions because the process is acid catalyzed. Best results are obtained with streams having a pH of 2 or slightly below. If high percentage nitrate removal (99+%) is desired, then some ammonia excess may be necessary. The sodium/sulfate ratio of strongly acidic streams containing excess ammonia is typically low ($\leq 0.5$) because the acid present in the stream is balanced not only by the alkali base but also by the ammonia. Under these circumstances, controlling the rate of corrosion only with the alkali metal becomes more difficult. However, treating these waste streams with minimal corrosion can be accomplished by the addition of a corrosion inhibitor such as acetic acid.

Finally, comparison between runs Ex 5, Run 2 and Ex 4, Run 2 shows that for these two comparable waste streams, the addition of acetate reduces the corrosiveness of the effluent stream as shown by the low level of heavy metals in stream 168. Thus, addition of a corrosion inhibitor can also improve the process even for cases where the sodium/sulfate ratios are higher than 0.5.

What is claimed is:

1. In a process for the wet oxidation of waste streams containing carbonaceous components and nitrogenous components, and sulfur or phosphorous containing components, using ammonium nitrate or precursor thereof as the oxidizing agent under conditions wherein the carbon and nitrogen forms are determined and the oxidized and reduced forms of carbon and nitrogen balanced such that the carbon forms are converted to carbon dioxide and the nitrogen forms and the sulfur or phosphorous containing components are converted to salts under elevated temperature and pressure conditions sufficient to maintain liquid phase conditions, the improvement which comprises adding acetate ion to the waste stream In an amount of from 0.06 to 0.17 moles/moles of nitrate or, if carbonaceous material convertible to acetate ion is present in the waste stream, maintaining a mole ratio of. acetate ion to nitrate in an amount of at least 0.06 moles acetate/mole nitrate, and maintaining a ratio of $M/SO_4^{-2}$ of from 0.1 to 4:1 and/or a ratio of $M/PO_4^{-3}$ of 0.1 to 2:1 in the waste stream during wet oxidation, wherein M is an alkali metal or alkaline earth metal cation and the ratio is maintained on an equivalence basis.

2. The method of claim 1 wherein pH is controlled by maintaining a ratio of $M/SO_4^{-2}$ of from 0.2 to 1:1 and a ratio of $M/PO_4^{-3}$ of from 0.2 to 0.67:1.

3. The method of claim 2 wherein the pH is controlled by addition of an alkali metal.

4. The method of claim 3 wherein the pH of the wet oxidation process is maintained within a range of about 1.8 to 4.

5. The method of claim 4 wherein the waste stream is contaminated with sulfur containing components and alkali metal, ammonium acetate or acetic acid is added to the waste stream.

6. The method of claim 5 wherein the temperature of wet oxidation is from 300 to 400° C.

7. The method of claim 5 wherein the waste stream is a stream contaminated with nitroaromatics.

* * * * *